R. W. PIERSON & T. F. BRIODY.
AUTOMOBILE BODY.
APPLICATION FILED MAY 12, 1916.

1,242,035.

Patented Oct. 2, 1917.
2 SHEETS—SHEET 1.

Witness
J. P. Wahler
James J. Dougan.

Inventors
R. W. Pierson,
T. F. Briody
By A. Randolph Jr.
Attorney

R. W. PIERSON & T. F. BRIODY.
AUTOMOBILE BODY.
APPLICATION FILED MAY 12, 1916.
1,242,035.
Patented Oct. 2, 1917.
2 SHEETS—SHEET 2.
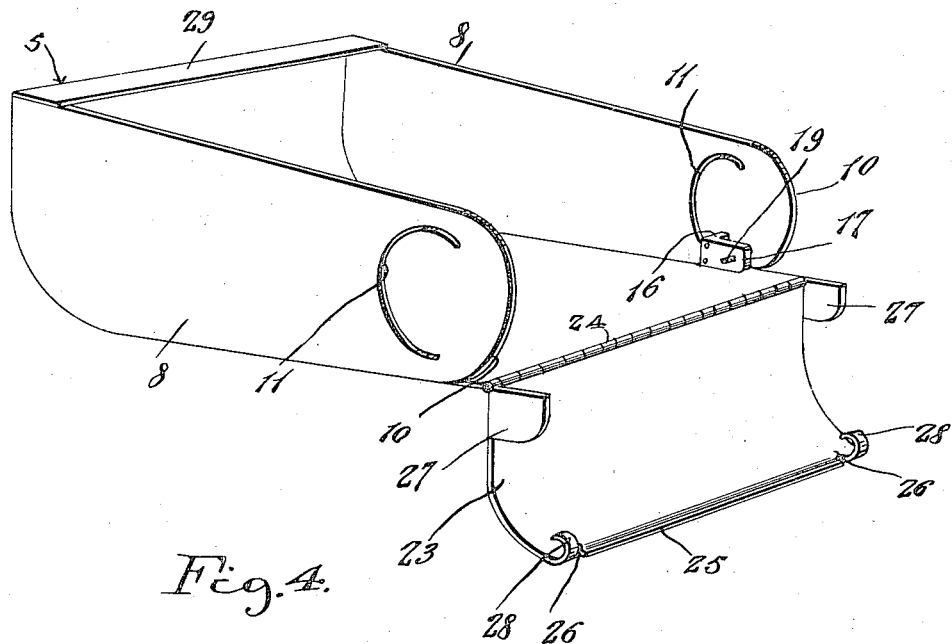
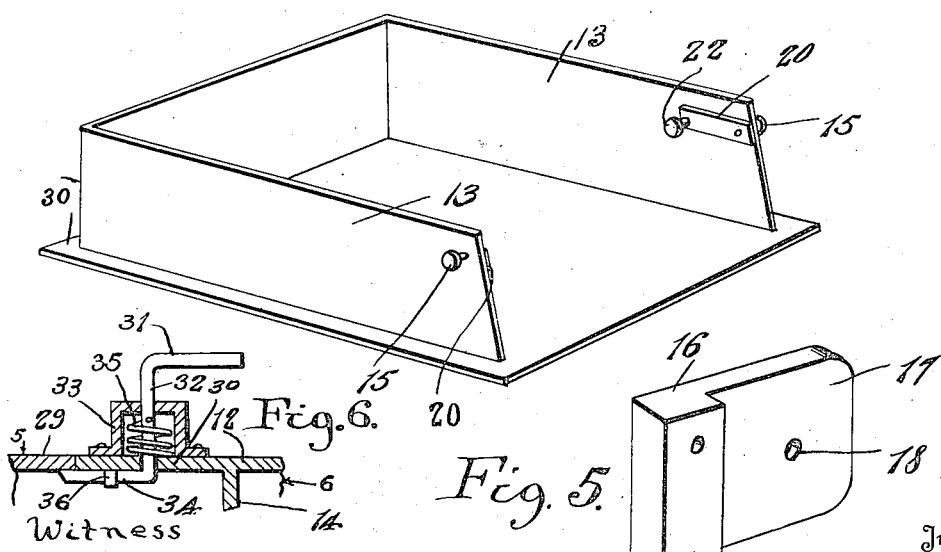

UNITED STATES PATENT OFFICE.

ROSCOE W. PIERSON AND THOMAS F. BRIODY, OF KANSAS CITY, MISSOURI.

AUTOMOBILE-BODY.

1,242,035. Specification of Letters Patent. Patented Oct. 2, 1917.

Application filed May 12, 1916. Serial No. 97,089.

*To all whom it may concern:*

Be it known that we, ROSCOE W. PIERSON and THOMAS F. BRIODY, citizens of the United States, residing at Kansas City, in the county of Jackson and State of Missouri, have invented certain new and useful Improvements in Automobile-Bodies; and we do hereby declare the following to be a full, clear, and exact description of the invention, such as will enable others skilled in the art to which it appertains to make and use the same.

This invention relates to improvements in that type of rear box located in rear of the single seat of an automobile of the roadster class, and which box is designed to be extended to provide a body for holding articles of large sizes, so as to admit of the vehicle being used as a delivery vehicle, an object of the invention being to form the rear box of a stationary section and a foldable section, the latter section, when in unfolded position, serving as an extension of the stationary section and when in folded position serving as a hood for the box.

Another object of the invention is the provision of a novel type of connection between the stationary and foldable sections, and means for relieving the connection from strain when the foldable section is in unfolded position.

A further object of the invention is the provision of a novel type of end gate for the box, which has associated therewith novel means for engaging the inner surfaces of the stationary and foldable sections when the foldable section is in folded position, and for holding the end gate in operative position.

Other objects will appear and be better understood from that embodiment of our invention of which the following is a specification, reference being had to the accompanying drawings forming a part thereof, in which:

Fig. 3 is a perspective view of the stationary section detached from the motor vehicle, Fig. 4 is a perspective view of the foldable section detached from the stationary section, and Fig. 5 is a perspective view of one of the stop plates employed for limiting the swinging movement of the foldable section.

Fig. 6 is a section taken through the top wall of the foldable section, showing the manner of locking the section in folded position.

Figure 1:
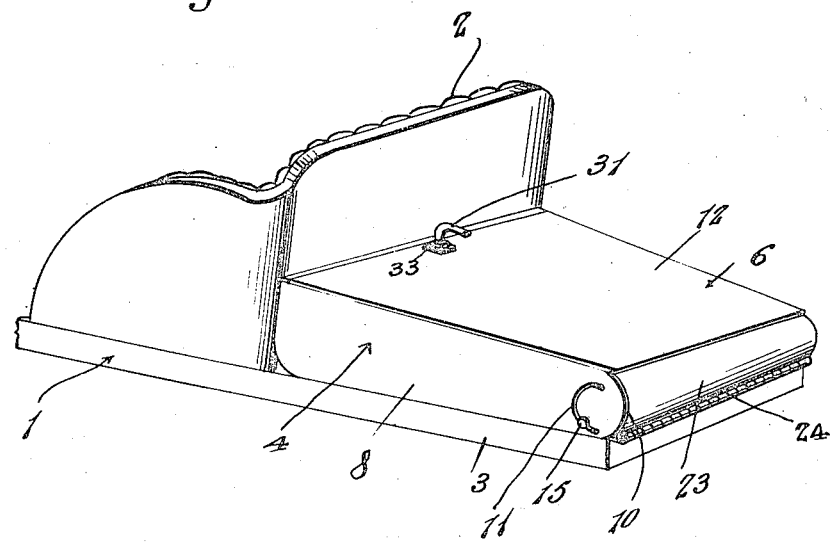
Figure 1 is a perspective view of the end box in closed position.

Referring to the drawings in detail, the numeral 1 designates a portion of the frame of a vehicle, 2 the seat and 3 that portion of the frame which extends rearwardly beyond the seat 2.

The rear box is designated, as an entirety, by the numeral 4 and consists of a stationary section 5 and a foldable section 6. The stationary section 5 is secured to the rear extension 3 of the frame 1, in any suitable manner, and comprises a floor 7, the opposite side walls 8—8, and forward end wall 9, the rear end of the section 5 being open. The rear ends of the side walls 8—8 have their terminals substantially rounded, as shown at 10, and the said side walls are provided adjacent their rear ends with opposed arcuate shaped slots 11.

Figure 2:
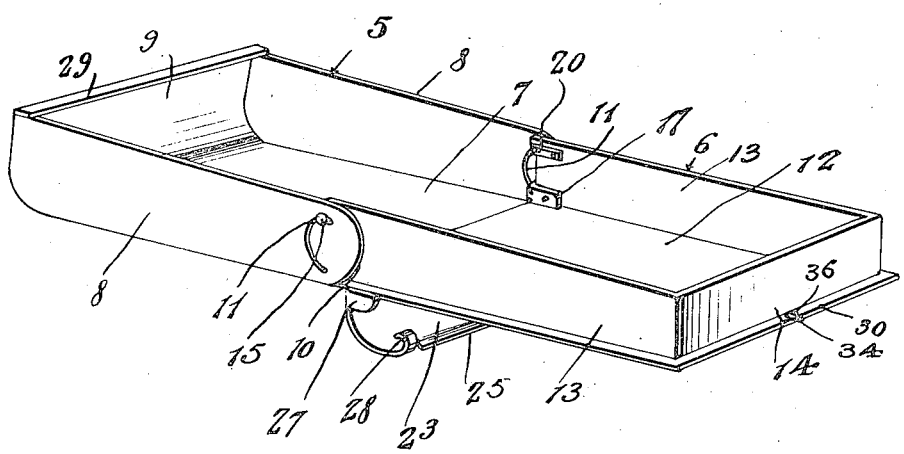
Fig. 2 is a perspective view thereof in open position.

The section 6 is adapted, when in folded position, to fit within the section 5 and forms a hood therefor and includes a top wall 12, side walls 13, forward end wall 14, the lower side and rear end of the section 6 being opened. The side walls 13 of the section 6 are provided at their rear ends with laterally projecting knobs 15, which are slidably received by the arcuate shaped slots 11 in the side walls 8—8 of the stationary section 5. When it is desired to convert the box 4 into a delivery body, the section 6 is swung upwardly and outwardly to the position shown in Fig. 2, the outward movement of the section 6 being limited by the engagement of the knobs 15 with the upper end walls of the slot 11.

Horizontally disposed L-shaped plates 16 are mounted on the inner sides of the rear ends of the walls 8—8 of the stationary section 5, and each has the shorter arm thereof located at the lower end of the adjacent arcuate slot 11, and terminally engaging the adjacent wall and the said plates have their long arms which are designated 17 arranged in spaced relation with the adjacent surfaces of the side walls 8 of the stationary section 5 to provide spaces which receive the adjacent ends of the side walls 13—13 when the foldable section 6 is in unfolded position. The long arms 17 are provided with threaded openings 18 therein which register, when the section 6 is in the position shown in Fig. 2, with openings in the adjacent side walls 13 of the section and in the side 8—8 of the section 5, for the reception of set screws 19, which serve to hold the section 6 against upward movement when the section is in unfolded position, and during the passage of the vehicle over any obstruction.

Plates 20 are mounted on the inner surfaces of the side walls 13 of the section 6, at the upper ends thereof, and serve to reinforce the sides and are provided with threaded openings therein which register with similar openings in the side walls 13 for the reception of set screws 22, which are adjustable against the sides 8—8 of the section 5. The stop plate 16 and the set screws 19 and 22 serve as means for relieving the knobs 15 from strain when the section 6 is in unfolded position.

The rear end of the stationary section 5 has associated therewith an end gate 23, which has hinged connection with the rear end of the bottom wall, as shown at 24. The end gate is of substantially concavo convex configuration in cross section, and has its free longitudinal edge provided with an offset flange 25 adapted to frictionally engage beneath the wall 12 of the foldable section 6, when the latter is in folded position, as shown in Fig. 1, and the corners of the free longitudinal edge of the end piece are cut away, as shown at 26, so as to give the desired resiliency to the offset flange 25. The side edges of the end piece are provided adjacent the connected longitudinal edge of the end piece, with inward extensions 27, which, when the end piece is in operative position, project into the section 5 and frictionally engage the inner surfaces of the side walls 8 of the section 5, and also close the spaces between the wall 7 and the adjacent rounded corners of the rear ends of the walls 8. The side edges of the end gate are also provided adjacent the free longitudinal edge of the end gate with lateral extensions 28, which project into the open end of the section 6 when the end gate is in operative position and frictionally engage the inner surfaces of the sides of the section 6.

A ledge 29 extends across the upper edge of the forward end wall of the section 5 and is adapted to form a rest for an extension 30 carried by the wall 12 of the foldable section 6 when the section 6 is in folded position.

A handle 31 is carried by the wall 12 of the section 6 and provides means by which the section 6 can be conveniently moved to folded or unfolded position. The handle 31 is carried by a rotatable spindle 32, that is journaled in a housing 33 and has its lower end provided with an angularly extending finger 34 adapted, when the section 6 is in folded position, to engage beneath the ledge 29 so as to lock the section 6 against jarring. A spring 35 embraces the spindle and has one end connected to the spindle and its opposite end suitably secured to the wall 12 of the section 6. When the handle is rotated to bring the finger 34 from beneath the ledge 29, the spring 35 will be tensioned so that when the handle is released the spring will return the finger to normal position. A depending stop 36 is carried by the under side of the extension 30 and is adapted to be engaged by the finger 34, when the latter returns to normal position so as to limit the movement of the finger.

It will, of course, be understood that various minor details of construction and arrangement of parts can be had without departing from the spirit of the invention as claimed.

Having thus described our invention what we claim as new, is:

1. The combination with a vehicle body having a seat, of a box located in rear of the seat and consisting of a stationary section and a foldable section, the said stationary section having walls provided with slots, the said foldable extension being adapted when in folded position to overlie the first-mentioned section and when in unfolded position to lie in horizontal alinement with the first-mentioned section, and means carried by the foldable section and slidably received by the slots in the walls of the first-mentioned section.

2. A box of the class described comprising a stationary section having one end open, a foldable section pivotally connected to the stationary section and having one end open and adapted to aline with the open end of the stationary section when the foldable section is in unfolded position and to overlie the open end of the stationary section when the foldable section is in folded position, a gate hingedly connected with the stationary section and adapted to close the open ends of the stationary and foldable sections when the foldable section is in folded position, and means carried by the gate for extending into the interior of the foldable section when the gate is in closing position, for the purpose specified.

3. A box of the class described comprising a stationary section including side walls, a foldable section carried by the stationary section and including side walls and adapted when in folded position to overlie the stationary section and when in unfolded position to lie in horizontal alinement with the stationary section, L-shaped elements located adjacent the side walls of the stationary section and having their short arms terminally engaging the walls and secured thereto, the longer arms of the L-shaped elements being spaced from the walls so as to coöperate with the walls of the stationary section in defining recesses for the reception of the side walls of the foldable section when the latter is in unfolded position, and elements adjustably associated with the long arms of the L-shaped elements for engaging the side walls of the foldable section when the latter is in unfolded position so as to prevent vertical movement of the foldable section.

In testimony whereof we affix our signatures in presence of two witnesses.

ROSCOE W. PIERSON.
THOMAS F. BRIODY.

Witnesses:
JOHN A. BARNES,
HARRY G. ALGEO.